(12) United States Patent
Harper

(10) Patent No.: US 7,096,730 B2
(45) Date of Patent: Aug. 29, 2006

(54) MEASUREMENT SYSTEMS

(76) Inventor: Alan Roger Harper, Unit One, Delaware Road, Gunnislake, Cornwall. PL18 9AR (GB)

( * ) Notice: Subject to any disclaimer, the term of this patent is extended or adjusted under 35 U.S.C. 154(b) by 263 days.

(21) Appl. No.: 10/441,349

(22) Filed: May 20, 2003

(65) Prior Publication Data
US 2004/0169300 A1  Sep. 2, 2004

(30) Foreign Application Priority Data
Feb. 28, 2003 (GB) .............................. 0304597.8

(51) Int. Cl.
*G01F 23/18* (2006.01)
(52) U.S. Cl. ............. 73/290 R; 73/37.5; 264/40.3
(58) Field of Classification Search ............ 73/149, 73/290; 264/40.5, 40.4
See application file for complete search history.

(56) References Cited

U.S. PATENT DOCUMENTS 4,112,760 A * 9/1978 Ishiwata ................ 73/299
4,840,064 A * 6/1989 Fudim ................... 73/290 B

* cited by examiner

*Primary Examiner*—Hezron Williams
*Assistant Examiner*—Paul M. West
(74) *Attorney, Agent, or Firm*—Melvin I. Stoltz

(57) ABSTRACT

An assembly that can be used in conjunction with a resin moulding apparatus includes means defining a chamber containing a pressure sensor, and an entry passage leading upwardly into the chamber. The arrangement is such that, when the assembly is mounted in an upper section of a mould and a moulding operation is being carried out, the resin enters the entry passage so that the level of resin in the entry passage increases producing an increase in the pressure within the chamber, and the configuration of the entry passage is such that the cross-sectional area thereof reduces with height.

6 Claims, 1 Drawing Sheet

MEASUREMENT SYSTEMS

FIELD OF THE INVENTION

This invention relates to measurement systems and is specifically concerned with the measurement of the pressure level in a closed mould.

The pressure sensors currently used in the arduous conditions associated with resin moulding processes are expensive and it is accordingly an object of the present invention to provide a measurement system which includes relatively inexpensive pressure sensors and which can be used for measuring the pressure level of resin introduced into a mould.

A further object of the present invention is the provision of an assembly including a pressure sensor that can be used in the conditions encountered in resin moulding operations.

A further object of the present invention is the provision of an improved resin moulding procedure.

SUMMARY OF THE INVENTION

According to a first aspect of the present invention there is provided a measurement system comprising a chamber containing a pressure sensor, and an entry passage leading upwardly into the chamber, the arrangement being such that, as the level of a liquid in the entry passage increases, the pressure within the chamber increases, and the configuration of the entry passage being such that the cross-sectional area thereof reduces with height.

According to a second aspect of the present invention there is provided an assembly that can be used in conjunction with a resin moulding apparatus, the assembly comprising means defining a chamber containing a pressure sensor, and an entry passage leading upwardly into the chamber, the arrangement being such that, when the assembly is mounted in an upper section of a mould and a moulding operation is being carried out, the resin enters the entry passage so that the level of resin in the entry passage increases producing an increase in the pressure within the chamber, and the configuration of the entry passage being such that the cross-sectional area thereof reduces with height.

According to a third aspect of the present invention, there is provided a resin moulding procedure that includes the use of an assembly as defined above.

The entry passage is preferably of inverted conical configuration and the wall of the entry passage is preferably of a material having a low coefficient of sliding friction with the resin. The preferred material is p.t.f.e. (polytetrafluoroethylene) and the entry passage may be formed in a body produced from p.t.f.e.

BRIEF DESCRIPTION OF THE DRAWINGS

The single FIGURE of the accompanying drawing is a sectional view of a measurement device installed in the upper section of a mould.

DESCRIPTION OF THE PREFERRED EMBODIMENT

Figure 1:
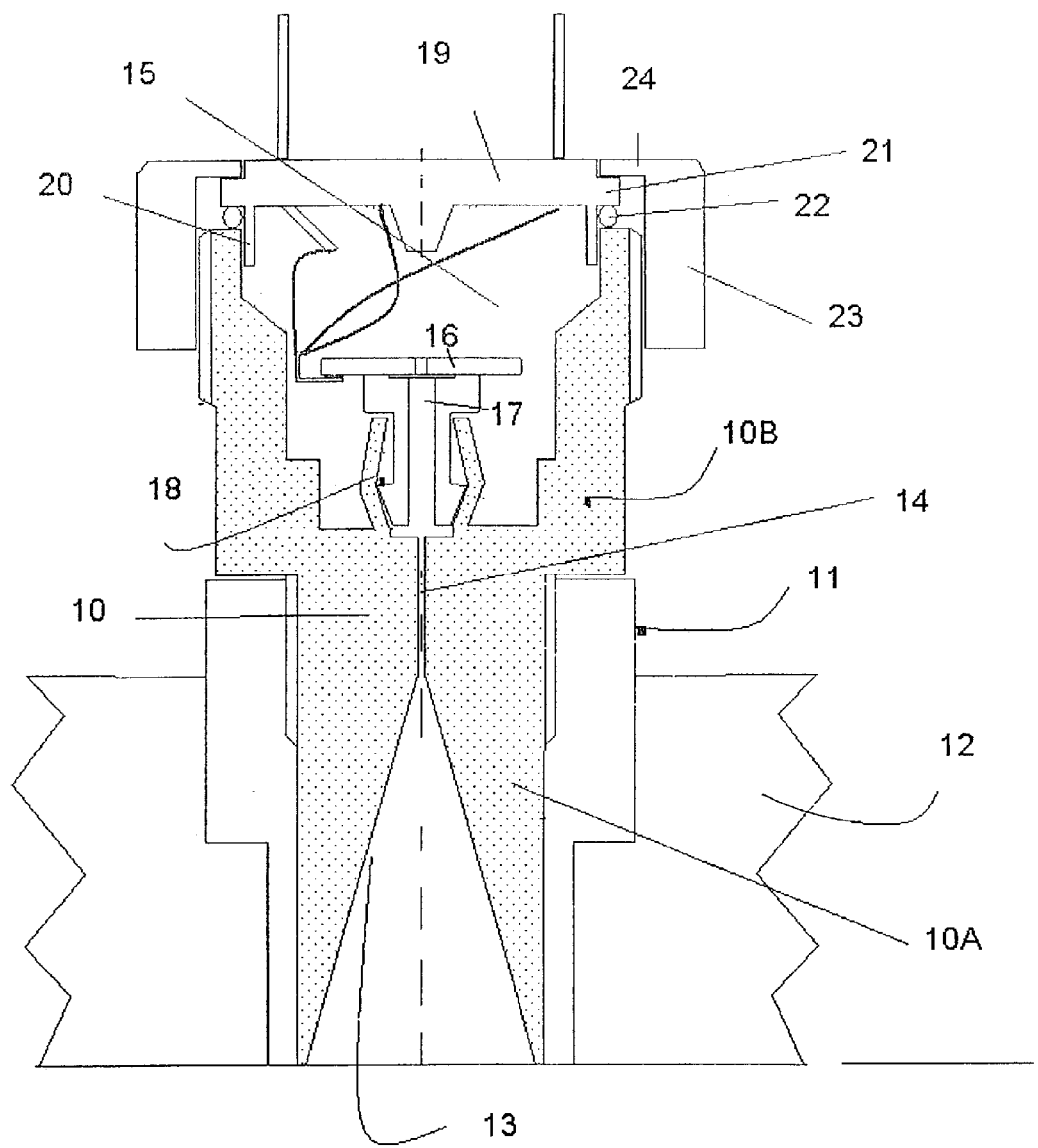

The measurement device shown in the drawing includes a p.t.f.e. (polytetrafluoroethylene) body 10 mounted in an insert 11 fitted in the upper section 12 of a mould. The p.t.f.e. body 10 is of one-piece construction and includes a portion 10A of constant external diameter that fits securely in a bore in the insert 11 in such manner that there can be no leakage of resin between the periphery of the body portion 10A and the bore of the insert 11. A cone-shaped entry passage 13 is formed in the portion 10A and this communicates with a small diameter axial bore 14.

The upper portion 10B of the p.t.f.e. body 10 is shaped so as to provide a chamber 15 within which a pressure sensor 16 is mounted. The pressure sensor 16 is held in position within the chamber 15 by engagement of a fitting 17 associated with the sensor 16 in a holding formation 18 formed integrally with the body 10. The method of fitting the pressure sensor 16 in the chamber 15 is such that pushing of the fitting 17 into engagement with the holding formation 18 serves to locate the fitting 17 (and hence the pressure sensor 16) resiliently in position within the chamber 15. The pressure sensor 16 is this in communication with the axial bore 14 and the entry passage 13 and is arranged to sense the difference in pressure between the chamber 15, which communicates with the atmosphere, the axial bore 14 and entry passage 13.

The top of the chamber 15 is closed by means of a cover 19 that includes a cylindrical portion 20 that fits within the top of the p.t.f.e. body 10. The cover 19 has a peripheral, outwardly projecting flange 21 and a resilient seal 22 is positioned beneath the flange 21 so that, when the cover 19 is fixed in position, the top of the chamber 15 is closed. The upper portion 10B of the body 10 is externally screw-threaded and the cover 19 is held in position by means of a cap 23 that is tightened onto the thread formation of the upper portion 10B of the body 10. The cap 23 includes an inwardly projecting flange 24 that engages the cover 19 to apply downward pressure to the cover 19, without causing rotation of the cover 19, as the cap 23 is rotated in the appropriate direction.

The electrical connections to the pressure sensor 16, which pass through the cover 19, are connected to a display, meter or the like so that an appropriate indication is given. The electrical connections to the pressure sensor 16 may, alternatively or additionally, be connected to a control unit (not shown) that controls the rate of supply of resin to the mould. As the electrical connections pass through the cover 19, rotation of the cover 19 should be avoided.

During filling of the mould with resin, a position is reached at which the flow of the resin in the mould reaches the lower end of the entry passage 13. As further resin is introduced into the mould, the liquid resin starts to rise up the passage 13. As the level of the resin continues to rise, the volume of air confined within the entry passage 13 and axial bore 14 is reduced and thus its pressure is increased proportionally. As the pressure sensor 16 is exposed to the pressure within the entry passage 13 via the bore 14, the pressure sensor 16 responds to the rise in the pressure level and hence to the rise in the level of the resin. Once the pressure has increased by a predetermined amount, corresponding to a predetermined resin pressure level, the control unit will send a signal to interrupt the flow of resin to the mould. Alternatively, a signal will be generated to inform the operator that the flow of resin to the mould should be stopped.

After the moulding operation has been completed, the resin in the entry passage 13 will solidify and, because of the conical shape of the hardened resin and the low coefficient of sliding friction between the p.t.f.e. body 10 and the hardened resin, the hardened resin is readily removable from the entry passage 13. As an alternative to forming the whole of the body 10 from p.t.f.e., it would be possible to form only the lower part of the body 10 from p.t.f.e. As a further alternative, the part of the body 10 that is engaged by the resin can be coated or lined with p.t.f.e.

The entry passage 13 is preferably of conical shape, as shown in the drawing. The sides of the entry passage may alternatively be of curvate form, provided that the cross-section of the entry passage 13 is continuously reducing from the lower end to the upper end thereof.

There is always an air gap between the pressure sensor 16 and the resin and it is accordingly possible to use a relatively low cost pressure sensor.

The invention claimed is:

1. A measurement system comprising a chamber containing air and a pressure sensor for sensing the pressure of the air, and an entry passage leading upwardly into the chamber for the entry of a liquid into the chamber, the arrangement being such that, as the level of the liquid in the entry passage increases, the pressure of the air within the chamber increases, and the configuration of the entry passage being such that the cross-sectional area thereof reduces with height.

2. A measurement system for use with a liquid resin supply system, the measurement system comprising a chamber containing a pressure sensor, and an entry passage leading upwardly into the chamber, the arrangement being such that, as the level of the liquid resin in the entry passage increases, the pressure within the chamber increases and in which the entry passage is of inverted conical configuration and the wall of the entry passage is of a material having a low coefficient of sliding friction with the resin.

3. A measurement system as claimed in claim 2, in which the material forming the wall of the entry passage is polytetrafluoroethylene.

4. A measurement system as claimed in claim 2, in which the entry passage is formed in a body produced from polytetrafluoroethylene.

5. An assembly for use in conjunction with a resin moulding apparatus, the assembly comprising means defining a chamber containing air and a pressure sensor for sensing the pressure of the air, and an entry passage leading upwardly into the chamber for the entry of a liquid resin into the chamber, the arrangement being such that, when the assembly is mounted in an upper section of a mould and a moulding operation is being carried out, the resin enters the entry passage so that the level of resin in the entry passage increases producing an increase in the pressure of the air within the chamber, and the configuration of the entry passage being such that the cross-sectional area thereof reduces with height.

6. An assembly for use in conjunction with a resin moulding apparatus, the assembly comprising means defining a chamber containing a pressure sensor, and an entry passage leading upwardly into the chamber, the arrangement being such that, when the assembly is mounted in an upper section of a mould and a moulding operation is being carried out, the resin enters the entry passage so that the level of resin in the entry passage increases producing an increase in the pressure within the chamber, and in which the entry passage is of inverted conical configuration and the wall of the entry passage is of a material having a low coefficient of sliding friction with the resin.

* * * * *